(12) United States Patent
Kawasaki

(10) Patent No.: US 6,705,293 B2
(45) Date of Patent: Mar. 16, 2004

(54) CONTROL SYSTEM AND METHOD FOR A MULTI-CYLINDER INTERNAL COMBUSTION ENGINE

(75) Inventor: Takao Kawasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 24 days.

(21) Appl. No.: 10/087,923

(22) Filed: Mar. 5, 2002

(65) Prior Publication Data

US 2002/0148439 A1 Oct. 17, 2002

(30) Foreign Application Priority Data

Apr. 13, 2001 (JP) ........................................ 2001-115106

(51) Int. Cl.[7] ................................................ F02D 7/00
(52) U.S. Cl. .................................... 123/481; 123/198 F
(58) Field of Search ............................ 123/481, 198 F, 123/350, 361; 73/118.2, 118.1

(56) References Cited

U.S. PATENT DOCUMENTS

| | | | |
|---|---|---|---|
| 4,165,610 A | * 8/1979 | Iizuka et al. | 60/284 |
| 4,207,856 A | * 6/1980 | Sugasawa et al. | 123/198 F |
| 5,374,224 A | * 12/1994 | Huffmaster et al. | 477/181 |
| 5,398,544 A | * 3/1995 | Lipinski et al. | 73/118.2 |
| 5,503,129 A | * 4/1996 | Robichaux et al. | 123/481 |
| 6,055,476 A | * 4/2000 | Yoshino | 701/110 |
| 6,138,636 A | * 10/2000 | Kohno et al. | 123/198 F |

FOREIGN PATENT DOCUMENTS

JP 11-182298 7/1999

* cited by examiner

Primary Examiner—Mahmoud Gimie
(74) Attorney, Agent, or Firm—Foley & Lardner

(57) ABSTRACT

A control system for a multi-cylinder internal combustion engine is provided. The engine is of the kind in which switching between a full cylinder operation with all cylinders in operation and a part cylinder operation with some of cylinders kept out of operation is selectively performed. The control system comprises a first calculator for calculating, at the part cylinder operation, a target intake air fuel quantity per one operative cylinder that enables the engine to produce a torque equal to that at the full cylinder operation, a second calculator for calculating a throttle valve target opening area at the part cylinder operation from the target intake air quantity per one operative cylinder, and a controller for controlling a throttle valve opening degree so that the throttle valve target opening area is obtained. A control method is also provided.

24 Claims, 5 Drawing Sheets

CONTROL SYSTEM AND METHOD FOR A MULTI-CYLINDER INTERNAL COMBUSTION ENGINE

BACKGROUND OF THE INVENTION

The present invention relates to a control system and method for a multi-cylinder internal combustion engine.

There has been proposed a control system for electronically controlling a throttle valve and thereby controlling a torque of an engine as disclosed in Japanese Patent Provisional Publication No. 11-182298.

SUMMARY OF THE INVENTION

In the meantime, for the purpose of attaining an improved fuel consumption, reduced shift shock, etc., it has been developed a multi-cylinder internal combustion engine which can electromagnetically control the operation mode of intake and exhaust valves of each cylinder. Namely, the engine is constructed so as to perform:

(1) switching between a full cylinder operation with all of the cylinders in operation and a part cylinder operation with some of the cylinders kept out of operation; and (2) switching between a standard cycle operation in which the engine is operated in a standard cycle (e.g., four-stroke cycle) and a modified cycle operation in which the engine is operated in a modified cycle different in the number of cycles from the standard cycle by controlling the operation of the intake and exhaust valves for thereby providing the standard cycle with an additional recompression stroke and an additional re-expansion stroke.

It is found that when a conventional throttle valve control system is applied to such a multi-cylinder engine as it is, there is caused a difference in torque between the times before and after switching to the part cylinder operation or to the modified cycle operation since the throttle valve opening degree is held unchanged before and after the switching.

In this connection, description is made by taking the engine adapted to perform the above described switching (1) as an example. At the time of switching from the full cylinder operation to the part cylinder operation, the torque cannot be maintained unchanged before and after the switching unless the torque produced by each cylinder at the part cylinder operation is made larger as compared with that at the full cylinder operation. Unless there is a difference in the quantity of intake air flowing through the throttle valve between the times before and after the switching, the quantity of intake air supplied to each operative cylinder at the part cylinder operation is increased naturally so that the torque produced by the engine must be held unchanged before and after the switching. However, in fact, the intake manifold vacuum is decreased with increase of the quantity of intake air per each cylinder at the part cylinder operation. Due to this, the pressure differential across the throttle valve is decreased, thus causing the quantity of air flowing through the throttle valve to decrease. Accordingly, in order that the quantity of intake air flowing through the throttle valve is maintained unchanged before and after the switching, it is necessary after switching to the part cylinder operation to make the opening of the throttle valve larger than that at the full cylinder operation. However, in the conventional control system, consideration on this matter has not yet been made and therefore the throttle valve opening degree is maintained unchanged before and after switching to the part cylinder operation, thus causing a sharp variation of torque at the time of the switching.

It is accordingly an object of the present invention to provide a control system for a multi-cylinder internal combustion engine that can prevent a sharp variation of torque at the time of switching from the full cylinder operation to the part cylinder operation or vice versa, by determining a target intake air quantity per one operative cylinder at the part cylinder operation in consideration of the fact that there is a difference in the influence on the quantity of intake air flowing through the throttle valve between the full cylinder operation and the part cylinder operation.

It is a further object of the present invention to provide a control system for a multi-cylinder internal combustion engine that can prevent a difference in torque between a standard cycle operation and a modified cycle operation, by determining a target intake air quantity per one cylinder at the modified cycle operation in consideration of the fact that then is a difference in the influence on the quantity of intake air flowing through the throttle valve between the standard cycle operation and the modified cycle operation.

It is a further object of the present invention to provide control methods for multi-cylinder internal combustion engines that are executed by the control systems of the foregoing character.

To achieve the above objects, there is provided according to an aspect of the present invention a control system for a multi-cylinder internal combustion engine in which switching between a full cylinder operation with all cylinders in operation and a part cylinder operation with some of cylinders kept out of operation is selectively performed, comprising a first calculator for calculating, at the part cylinder operation, a target air fuel quantity per one operative cylinder that enables the engine to produce a torque equal to that at the full cylinder operation, a second calculator for calculating a throttle valve target opening area at the part cylinder operation from the target intake air quantity per one operative cylinder, and a controller for controlling a throttle valve opening degree so that the throttle valve target opening area is obtained.

According to another aspect of the present invention, there is provided a control system for a multi-cylinder internal combustion engine in which switching between a standard cycle operation in which the engine is operated in a standard cycle and a modified cycle operation in which the engine is operated in a modified cycle different in the number of strokes from the standard cycle by controlling operations of intake and exhaust valves, comprising a first calculator for calculating, at the modified cycle operation, a target intake air quantity per one cylinder that enables the engine to produce a torque equal to that at the standard cycle operation, a second calculator for calculating a throttle valve target opening area at the modified cycle operation from the target intake air quantity per one cylinder, and a controller for controlling a throttle valve opening degree so that the throttle valve target opening area is obtained.

According to a further aspect of the present invention, there is provided a control system for a multi-cylinder internal combustion engine in which switching between full cylinder operation with all cylinders in operation and part cylinder operation with some of cylinders kept out of operation is selectively performed, comprising means for calculating, at the part cylinder operation, a target air fuel quantity per one operative cylinder that enables the engine to produce a torque equal to that at the full cylinder operation, means for calculating a throttle valve target opening area at the part cylinder operation from the target intake air quantity per one operative cylinder, and means for controlling a throttle valve opening degree so that the throttle valve target opening area is obtained.

According to a further aspect of the present invention, there is provided a control system for a multi-cylinder internal combustion in which switching between a standard cycle operation in which the engine is operated in a standard cycle and a modified cycle operation in which the engine is operated in a modified cycle different in the number of strokes from the standard cycle by controlling operations of intake and exhaust valves, comprising means for calculating, at the modified cycle operation, a target intake air quantity per one cylinder that enables the engine to produce a torque equal to that at the standard cycle operation, means for calculating a throttle valve target opening area at the modified cycle operation from the target intake air quantity per one cylinder, and means for controlling a throttle valve opening degree so that the throttle valve target opening area is obtained.

According to a further aspect of the present invention, there is provided a control method for a multi-cylinder internal combustion engine in which switching between full cylinder operation with all cylinders in operation and part cylinder operation with some of cylinders kept out of operation is selectively performed, comprising calculating, at the part cylinder operation, a target air fuel quantity per one operative cylinder that enables the engine to produce a torque equal to that at the full cylinder operation, calculating a throttle valve target opening area at the part cylinder operation from the target intake air quantity per one operative cylinder, and controlling a throttle valve opening degree so that the throttle valve target opening area is obtained.

According to a further aspect of the present invention, there is provided a control method for a multi-cylinder internal combustion engine in which switching between a standard cycle operation in which the engine is operated in a standard cycle and a modified cycle operation in which the engine is operated in a modified cycle different in the number of strokes from the standard cycle by controlling operations of intake and exhaust valves, comprising calculating, at the modified cycle operation, a target intake air quantity per one cylinder that enables the engine to produce a torque equal to that at the standard cycle operation, calculating a throttle valve target opening area at the modified cycle operation from the target intake air quantity per one cylinder, and controlling a throttle valve opening degree so that the throttle valve target opening area is obtained.

DESCRIPTION OF THE PREFERRED EMBODIMENT

Figure 1:
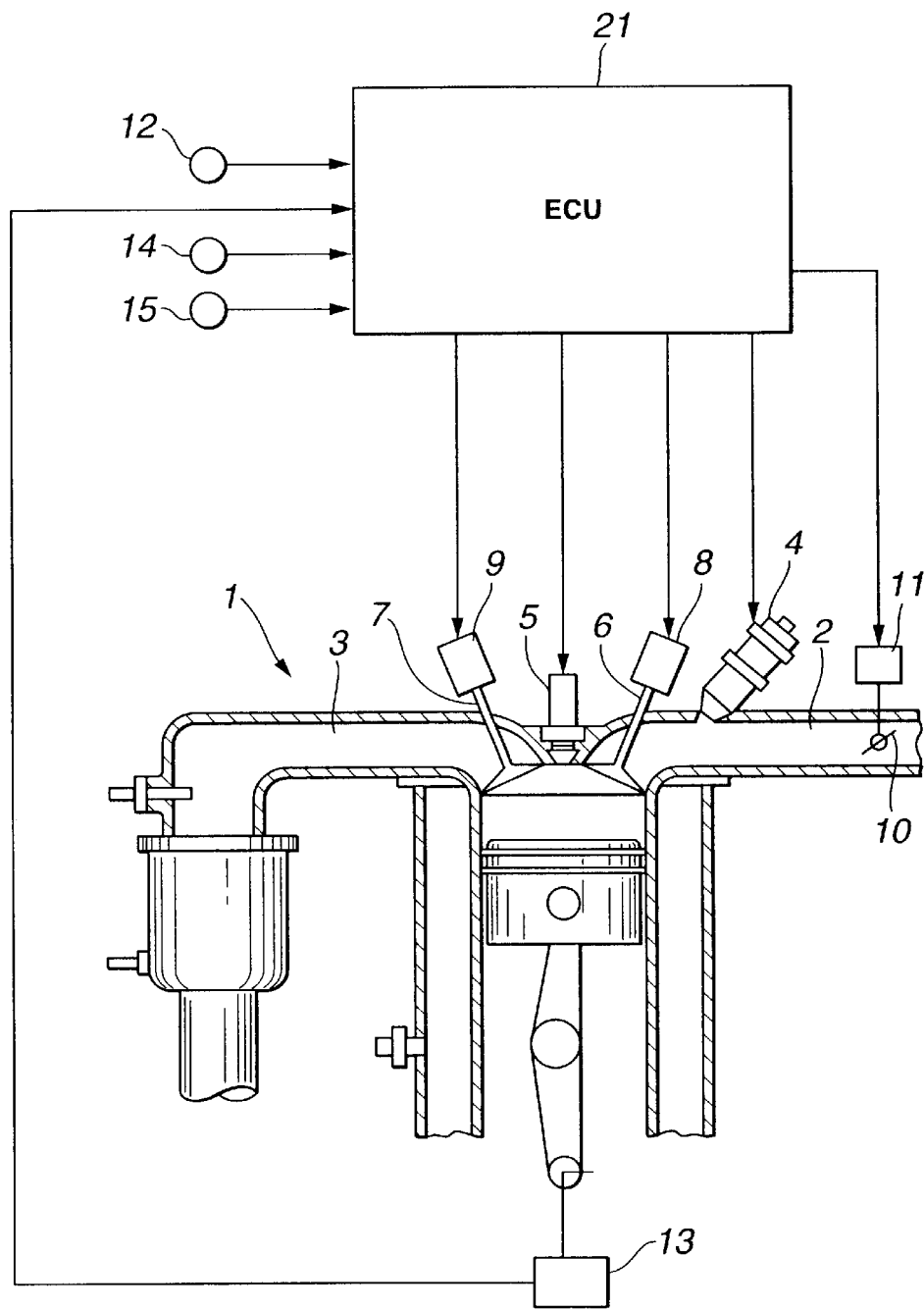
FIG. 1 is a schematic view of a control system for a multi-cylinder internal combustion engine according to an embodiment of the present invention.

Referring first to FIG. 1, multi-cylinder internal combustion engine 1 includes intake passage 2, exhaust passage 3, fuel injector 4 and ignition plug 5. Though fuel injector 4 may be structured so as to inject fuel toward an intake port as shown, it is actually structured in the embodiment so as to inject fuel directly into a combustion chamber (no numeral).

Engine 1 further includes intake valve 6 and exhaust valve 7 which are electromagnetically driven to open and close by means of electromagnetic actuators 8 and 9.

Indicated by 10 is a throttle valve whose opening degree is controlled by throttle valve controller 11.

To electronic control unit (ECU) 21 are supplied from accelerator opening degree sensor 12 an accelerator opening signal representative of an accelerator opening degree (i.e., depression of an accelerator pedal that corresponds to an engine load) and from crank angle sensor 13 a position signal representative of a crankshaft position every unit crank angle and a reference signal every phase difference of a cylinder stroke (engine speed is obtained by calculating the number of occurrence of position signals per unit time or by calculating the generation cycle of the reference signal), together with a signal representative of intake air quantity from airflow meter 14 and a signal representative of coolant temperature from coolant temperature sensor 15. ECU 21 controls fuel injection by fuel injector 4 and ignition by spark plug 5. Further, ECU 21 controls the opening degree of throttle valve 10 by way of throttle valve controller 11 and the opening and closing timings of intake and exhaust valves 6 and 7 by way of electromagnetic actuators 8 and 9.

In this connection, ECU 21 determines a target air/fuel ratio that is varied depending upon a variation of an engine operating condition for the purpose of improving the fuel consumption while meeting with a high load operation. For example, at low load operation, engine 1 is operated at a stratified combustion with a view to attaining an ultra-lean air-fuel ratio exceeding beyond 40:1 and improving the fuel consumption. In contrast to this, at high load operation, engine 1 is operated at a homogeneous combustion with a view to attaining a stoichiometric air/fuel ratio and a sufficient output.

Further, when the engine speed is maintained constant, the engine torque varies in proportion to the quantity of intake air passing through the throttle valve. Thus, the target intake air quantity for each cylinder is determined based on the accelerator opening degree and the engine speed, and the opening degree of throttle valve 10 is controlled by throttle valve controller 11 so that the target intake air quantity is obtained. For this reason, by giving attention to the fact that a relation between a volumetric flow ratio which is a value obtained by dividing an intake air quantity per one cylinder by a maximum intake air quantity resulting at the same engine speed as that when the first-mentioned intake air quantity is obtained and a value obtained by dividing a throttle valve opening area by an engine displacement and an engine speed (herein defined as "opening area coefficient") exhibits the same characteristics irrespective of the engine speed and the engine displacement, the target intake air quantity and the target throttle valve opening area are obtained by ECU 21 by using the relation of the volumetric flow ratio and the opening area coefficient. Such control is disclosed in Japanese Patent Provisional Publication No. 11-182298 and detailed description thereto is herein omitted. In brief, the target throttle valve opening degree is calculated as follows.

(1) The total required opening area TTAAAPO is calculated based on the accelerator opening degree.

(2) A target opening area coefficient TGADNV is calculated by dividing the total required opening area TTAAAPO by the displacement and the engine speed NE.

(3) The target opening area coefficient TGADNV is converted into a target basic volumetric flow ratio TQH0ST by using the above described relation between the volumetric flow ratio and the opening area coefficient. The target basic volumetric flow ratio TQH0ST is a target volumetric flow ratio when the air-fuel ratio is stoichiometric.

(4) A target basic intake air quantity TTPST is calculated by multiplying the target basic volumetric flow ratio TQH0ST by a maximum intake air quantity MAXTP. The maximum intake air quantity MAXTP is a value that varies depending upon a variation of the engine speed.

(5) A target intake air quantity TTP is calculated by dividing the target basic intake air quantity TTPST by a target equivalence ratio DML.

(6) The target volumetric flow ratio TGQH0 is calculated by dividing the target intake air quantity TTP by the maximum intake air quantity MAXTP.

(7) The target volumetric flow ratio TGQH0 is converted into the target opening area coefficient by using the above described relation between the volumetric flow ratio and the opening area coefficient.

(8) A throttle valve target opening area TAAIR is calculated by multiplying the target opening area coefficient by the displacement and the engine speed NE.

(9) The target opening area TAAIR is converted into a target throttle valve opening degree TDTVO by using a predetermined table.

In this manner, the throttle valve control apparatus disclosed in Japanese Patent Provisional Publication No. 11-182298 first performs conversion from the opening area coefficient into the volumetric flow ratio by using the relation between the volumetric flow ratio and the opening area coefficient and then performs conversion reversely from the volumetric flow ratio into the opening area coefficient.

Figure 2:
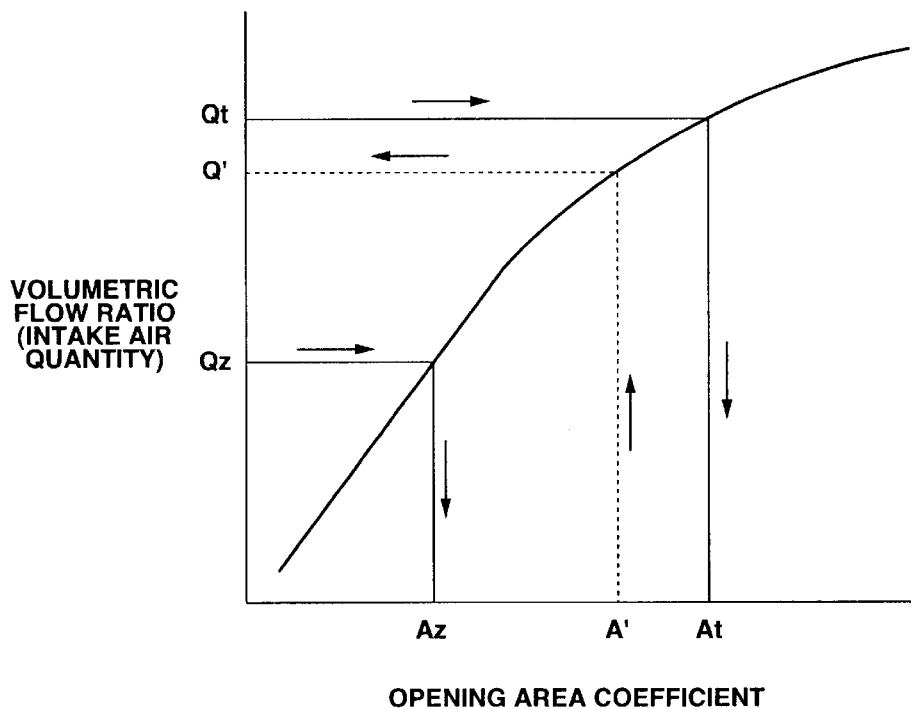
FIG. 2 is a graph showing a relation between volumetric flow ratio and opening area coefficient for use in the control system of FIG. 1.

In this instance, at the time of switching to the part cylinder operation under a predetermined operating condition by controlling the opening and closing timings of intake and exhaust valves 6 and 7 by means of electromagnetic actuators 8 and 9, the quantity of intake air flowing through the throttle valve becomes smaller as compared with that at the full cylinder operation if the throttle valve opening degree is held unchanged before and after the switching, thus causing a sharp variation of torque (decrease of torque) at the time of switching from the full cylinder operation to the part cylinder operation (or vice versa). This will be described more in detail by reference to FIG. 2. FIG. 2 shows the relation between the volumetric flow ratio and the opening area coefficient described at the above calculating steps (3) and (7). Though the ordinate is a volumetric flow ratio, it is regarded as intake air quantity for the convenience of description.

Firstly, if the required intake air quantity per one cylinder at the full cylinder operation is Qz and the opening area coefficient for attaining Qz is Az, it will suffice to determine the throttle valve opening degree so that Az is obtained.

Then, it is supposed that switching is performed from this condition to the part cylinder operation. For convenience of description, it is supposed that a half of all the cylinders is kept out of operation. If the throttle valve opening degree at the part cylinder operation is maintained the same as that at full cylinder operation, the opening area coefficient A' per one cylinder is two times as large as Az (i.e., A=Az×2) and therefore an intake air quantity Q' corresponding to the opening area coefficient A' is an intake air quantity per one operative cylinder at the part cylinder operation.

However, it will be seen from FIG. 2 that Q' is not two times as large as Qz but smaller than Qz×2. This is because the opening area coefficient and the volumetric flow ratio are not proportional to each other throughout the overall engine operating range but when the opening area coefficient is relatively large, the opening area coefficient and the intake air quantity are not proportional to each other.

Thus, in this embodiment, at the same part cylinder operation where a half of all the cylinders is kept out of operation, Qt that is two times as large as Qz (i.e., Qt=Qz×2) as shown in FIG. 2 is calculated, and the opening area coefficient At corresponding to Qt is calculated as the target opening area coefficient at the part cylinder operation. The throttle valve opening degree is controlled so that At is obtained.

By such a method of this embodiment, the intake air quantity (volumetric flow ratio) per one cylinder is varied directly based on the operative cylinder number ratio, thus not causing a lack of an intake air quantity per one operative cylinder at the time of switching to the part cylinder operation and making it possible to further suppress a sharp variation of torque at the time of switching from the full cylinder operation to the part cylinder operation (or vice versa).

Specifically, the following control is carried out between the above described control steps (6) and (7).

(6') The value obtained by dividing the target volumetric flow ratio by the operative cylinder number ratio is determined anew as the target volumetric flow ratio TGQH0. Or, in order to distinguish between the values before and after the dividing by the operative cylinder number ratio, the target volumetric flow ratio at the control step (6) is determined anew as TGQH01 and the value obtained by dividing TGQH01 by the operative cylinder number ratio is determined as TGQH0. The value after the dividing by the operative cylinder number ratio represents, at the part cylinder operation, the target volumetric flow ratio per one operative cylinder at that time.

Figure 3:
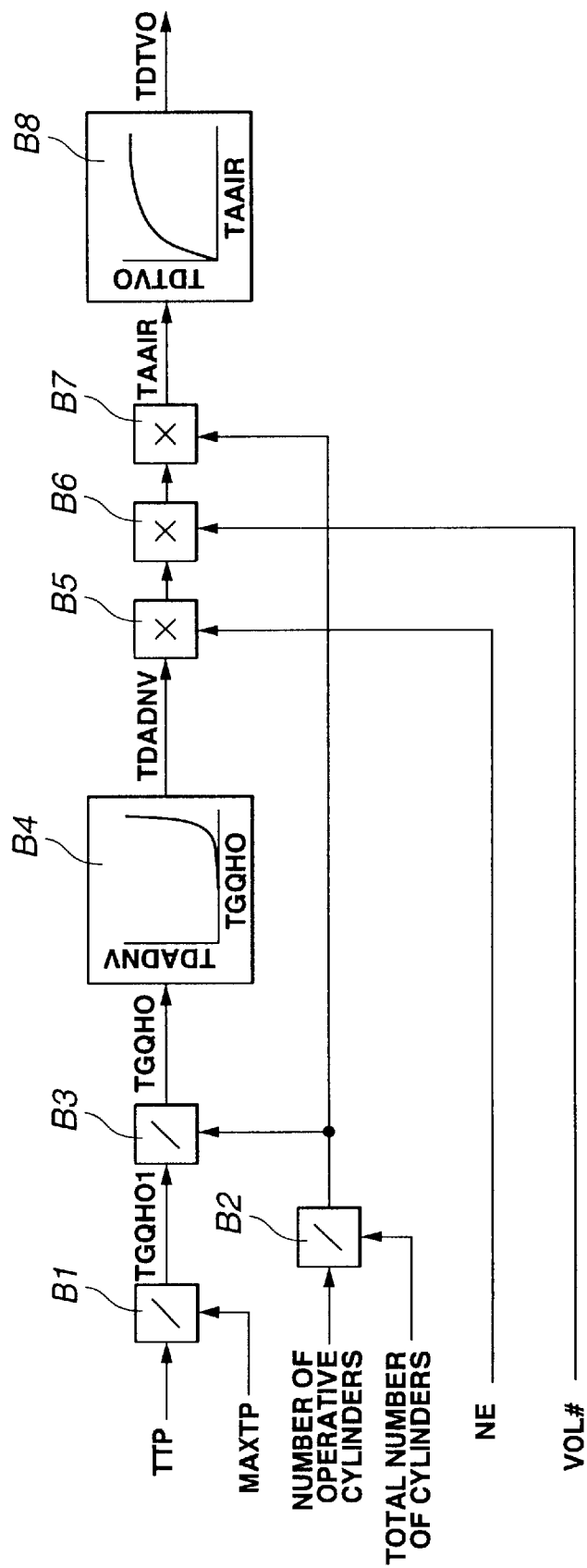
FIG. 3 is a block diagram illustrating calculation of a target throttle valve opening degree, executed in the control system of FIG. 1.

The details of the throttle valve control executed by a microcomputer incorporated in ECU 21 will be described with reference to the block diagram of FIG. 3.

In block B1, the target volumetric flow ratio TGQH01 is determined or calculated by dividing the target intake air quantity TTP by the maximum intake air quantity MAXTP.

In this instance, TTP is the target intake air quantity at the full cylinder operation (normal operation). The maximum intake air quantity MAXTP varies depending upon a variation of the engine speed and is therefore determined from a predetermined table on the basis of the engine speed at that time.

In block B2, the operative cylinder number ratio is calculated by dividing the number of operative cylinders by the total number of cylinders. In block B3, the above described target volumetric flow ratio TGQH01 is divided by the operative cylinder number ratio, and the value obtained by this division is determined as the target volumetric flow ratio TGQH0. TGQH0 represents, at the part cylinder operation, the target volumetric flow ratio per one operative cylinder. For example, when a half of all cylinders is kept out of operation, the operative cylinder number ratio is 1/2. At this time, the target volumetric flow ratio per one operative cylinder is just two times as large as that at the full cylinder operation.

Figure 4:
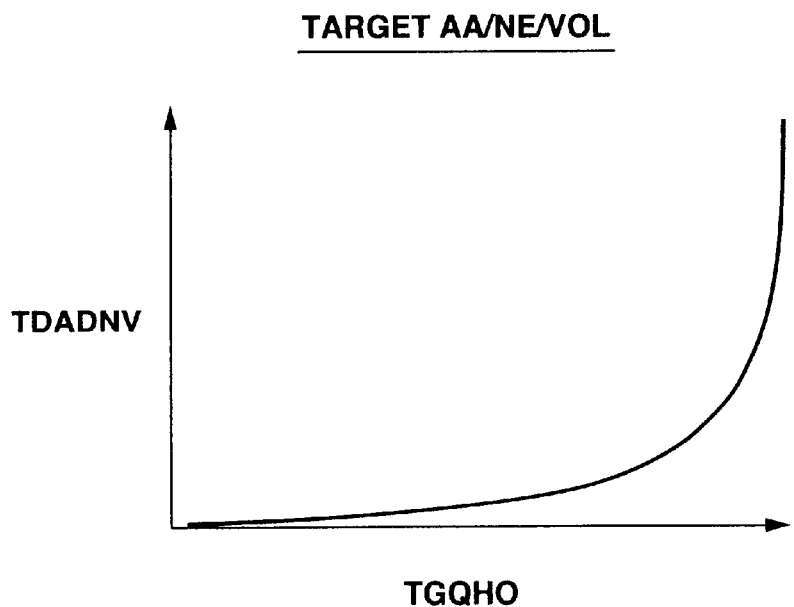
FIG. 4 is a graph showing a relation between volumetric flow ratio and opening area coefficient for use in the control system of FIG. 1.

In block B4, the target opening area coefficient TDADNV is obtained by retrieving the table data (characteristics showing the relation between the volumetric flow ratio and the opening area coefficient) whose characteristics are shown in FIG. 4, using the value TG0H0 corrected in the above-described manner by the operative cylinder number ratio as address data. The characteristics shown in FIG. 4 is basically the same as that shown in FIG. 2. Namely, it is shown that in the zone where the pressure differential across the throttle valve disappears (subsonic zone), the flow rate of intake air is not proportional to the throttle opening area.

In blocks B5 through B7, the throttle valve target opening area TAATR is calculated by multiplying the target opening area coefficient TDADNV by the engine speed NE, the displacement VOL# and the operative cylinder number ratio. At the part cylinder operation, TAATR represents the throttle valve opening area that can attain the target volumetric flow ratio corrected by the operative cylinder number ratio.

In this manner, the volumetric flow ratio is converted into the opening area coefficient by adding thereto the operative cylinder number ratio. In this instance, the apparent displacement at the part cylinder operation is a value obtained by the displacement of one cylinder by the operative cylinder number ratio (i.e., 1/2 when a half of all cylinders are kept out of operation), so that this is also taken into consideration.

Figure 5:
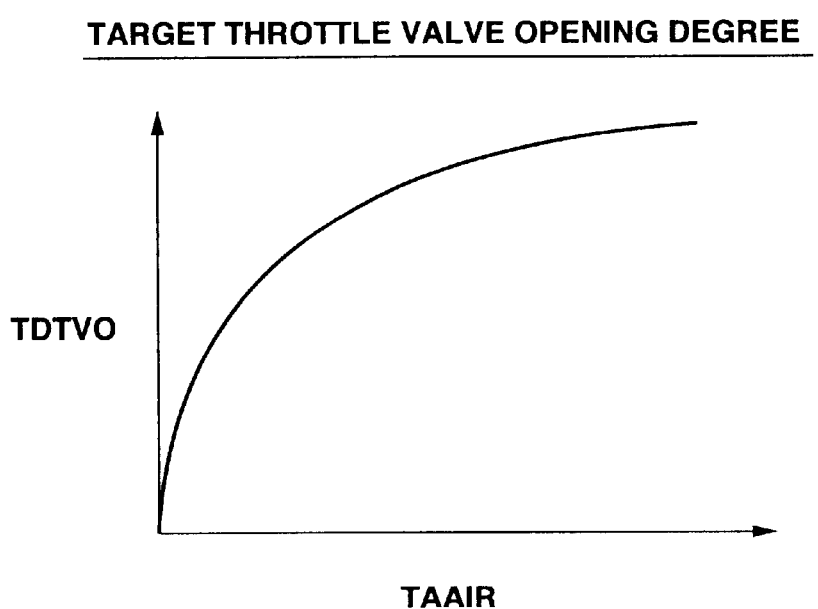
FIG. 5 is a graph showing a relation between opening area and throttle valve opening degree for use in the control system of FIG. 1.

In block B8, the target throttle opening TDTVO is obtained by retrieving the table data whose characteristics are shown in FIG. 5 using the throttle valve target opening area TAAIR obtained in the above-described manner as address data. The target throttle valve opening TDTVO is supplied as a controlled variable to throttle valve controller 11, and throttle valve 10 is driven so that the target throttle valve opening degree is attained.

The operation of this embodiment will be described with respect to the case where a half of all cylinders is kept out of operation, by reference to FIG. 2.

When the target volumetric flow ratio (target intake air quantity) is Qz, engine 1 is in a condition of being controlled so that the opening area coefficient is Az. When switching from this condition to the part cylinder operation is made, the intake air having been to flow into the inoperative cylinders is caused to flow into the operative cylinders, thus causing the intake air quantity per one operative cylinder at the part cylinder operation to increase. On the other hand, the pressure within the intake passage becomes smaller as compared with that at the full cylinder operation, thus decreasing the intake air quantity flowing through the throttle valve and causing a decrease of torque if the throttle valve opening degree is held unchanged after switching to the part cylinder operation.

In contrast to this, according to this embodiment, when the operative cylinder number ratio is ½ at the part cylinder operation and therefore the target volumetric flow ratio at this time is just double the value Qz (i.e., Qt) at the full cylinder operation, the opening area coefficient At is calculated so as to correspond to the doubled value Qt and the throttle valve opening degree is controlled so that At is obtained. According to this embodiment, the throttle valve opening degree is controlled so that At that is larger than A' is obtained. By this, an engine torque corresponding to a value obtained by subtracting A' from At is produced additionally for thereby eliminating a sharp variation of torque at the time of switching to the part cylinder operation.

In this manner, according to this embodiment, the volumetric flow ratio is corrected based on the operative cylinder number ratio. By this, the target intake air quantity per one cylinder that enables the engine to produce a torque equal to that at the full cylinder operation, thus making it possible to eliminate a sharp variation of torque at the time of switching from the full cylinder operation to the part cylinder operation.

In case intake and exhaust valves 6 and 7 are adapted to be driven to open and close by means of electromagnetic actuators 8 and 9, it becomes possible to switch the operation of engine 1 from a standard cycle operation (e.g., four-stroke cycle) to a modified cycle operation (e.g., six-stroke cycle) by arbitrarily controlling the operation of intake and exhaust valves 6 and 7 so as to provide the standard cycle with an additional recompression stroke and re-expansion stroke. According to the present invention, in such a multi-cylinder internal combustion engine, the ratio obtained by dividing the number of strokes of the standard cycle by the number of strokes of the modified cycle is used in place of the operative cylinder number (the opening area coefficient is divided by this ratio).

In this connection, the ratio obtained by dividing the number of strokes of the standard cycle by the number of strokes of the modified cycle is, for example, 4/6=2/3 when the number of strokes of the standard cycle is 4 and the number of strokes of the modified cycle is 6. The reason why the ratio obtained by dividing the number of strokes of the standard cycle by the number of strokes of the modified cycle can be used to replace the operative cylinder number is that when the four-stroke cycle engine is modified so as to operate in six-stroke cycle the apparent displacement is 4/6 of that at the time of operation of the engine in four-stroke cycle.

In the meantime, in a multi-cylinder engine in which switching between a standard cycle operation and a modified cycle operation is performed selectively, there is caused a sharp variation of torque at the time of switching from the standard cycle operation to the modified cycle operation (or vice versa).

Figure 6:
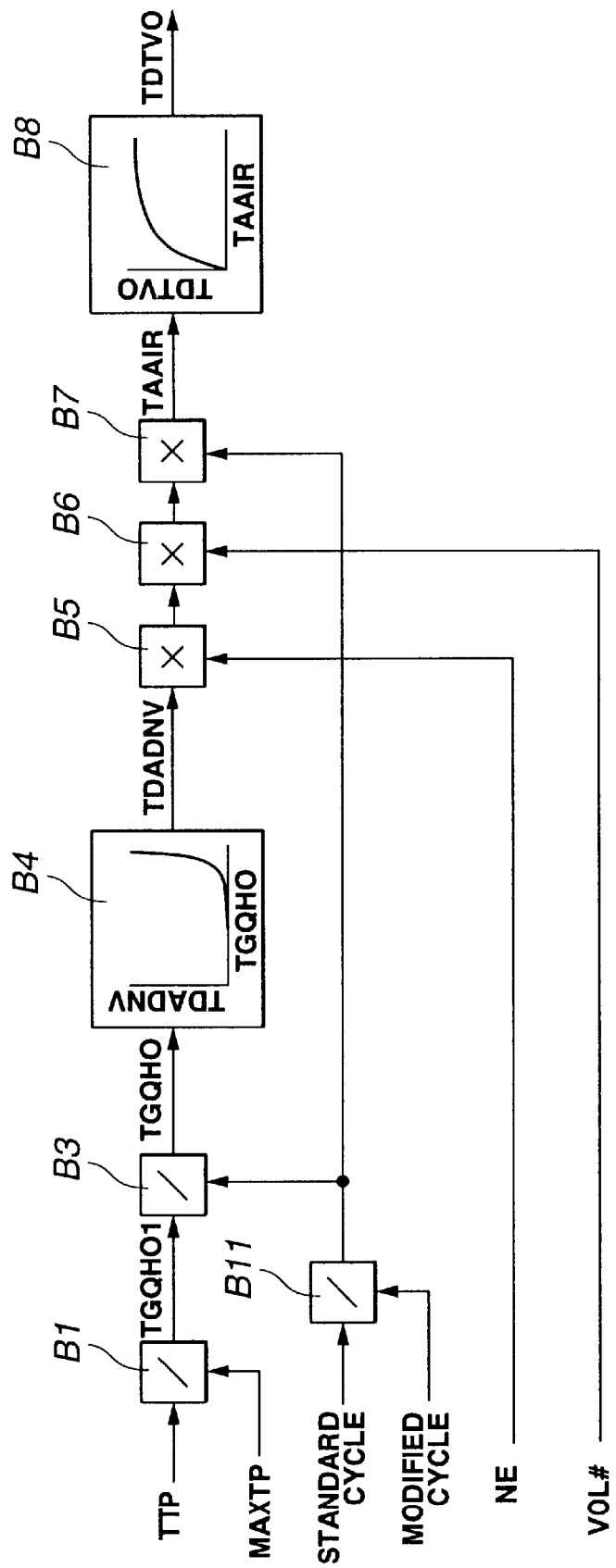
FIG. 6 is a block diagram illustrating calculation of a target throttle valve opening degree, executed in a control system according to a second embodiment of the present invention.

Thus, as shown in the block diagram of FIG. 6, a control of the throttle valve opening degree is executed in a microcomputer incorporated in ECU 21 according to the second embodiment. Namely, even in a multi-cylinder internal combustion engine in which switching between a standard cycle operation and a modified cycle operation is selectively performed, a difference in torque between the times before and after the switching can be eliminated by correcting the target volumetric flow ratio based on the ratio obtained by dividing the number of strokes of the standard cycle by the number of strokes of the modified cycle (blocks B11 and B3). In FIG. 6, like portions to those in FIG. 3 are designated by like reference characters.

The entire contents of Japanese Patent Application No. 2001-115106 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the embodiment has been described with respect to the case where the table showing the relation between the volumetric flow ratio and the opening area coefficient shown in FIG. 4 is used, this is not for the purpose of limitation. For example, the volumetric flow ratio can be replaced by the intake air quantity and the opening area coefficient can be replaced by the throttle opening area. However, in case a table showing a relation between an intake air quantity and a throttle valve opening area is used, the relation varies depending upon the speed and the displacement, so that more tables are necessitated. The scope of the invention is defined with reference to the following claims.

What is claimed is:

1. A control system for a multi-cylinder internal combustion engine in which switching between full cylinder operation with all cylinders in operation and part cylinder operation with some of cylinders kept out of operation is selectively performed, the control system comprising:
   a first calculator for calculating, at the part cylinder operation, a target intake air quantity per one operative cylinder that enables the engine to produce a torque equal to that at the full cylinder operation;
   a second calculator for calculating a throttle valve target opening area at the part cylinder operation from the target intake air quantity per one operative cylinder; and
   a controller for controlling a throttle valve opening degree so that the throttle valve target opening area is obtained.

2. A control system according to claim 1, wherein the target intake air quantity per one operative cylinder at the part cylinder operation is a value obtained by dividing a target intake air quantity per one operative cylinder at the full cylinder operation by a ratio of the number of operative cylinders at the part cylinder operation to the total number cylinders.

3. A control system according to claim 1, wherein the first calculator calculates a target volumetric flow ratio per one operative cylinder in place of the target intake air quantity, and the second calculator calculates the throttle valve target opening area from the target volumetric flow ratio in place of the target intake air quantity.

4. A control system according to claim 1, wherein the second calculator further calculates a target opening area coefficient that is a value obtained by dividing the target throttle valve opening area by a displacement and an engine speed, and the controller controls the throttle valve opening degree so that the target opening area coefficient is obtained in place of the target throttle valve opening area.

5. A control system according to claim 1, wherein the target intake air quantity per one operative cylinder at the part cylinder operation is calculated based on a target intake air quantity per one operative cylinder at the full cylinder operation, the total number of cylinders, and the number of operative cylinders at the part cylinder operation.

6. A control system according to claim 1, wherein the target intake air quantity per one operative cylinder is calculated based on a target intake air quantity per one operative cylinder at the full cylinder operation, a total number of cylinders, and a number of operative cylinders at a part cylinder operation.

7. A control system for a multi-cylinder internal combustion engine in which switching between a standard cycle operation in which the engine is operated in a standard cycle and a modified cycle operation in which the engine is operated in a modified cycle different in the number of strokes from the standard cycle by controlling operations of intake and exhaust valves, comprising:
   a first calculator for calculating, at the modified cycle operation, a target intake air quantity per one cylinder that enables the engine to produce a torque equal to that at the standard cycle operation;
   a second calculator for calculating a throttle valve target opening area at the modified cycle operation from the target intake air quantity per one cylinder; and
   a controller for controlling a throttle valve opening degree so that the throttle valve target opening area is obtained.

8. A control system according to claim 7, wherein the target intake air quantity per one cylinder is a value obtained by multiplying a target intake air quantity per one cylinder at the standard cycle operation by a ratio of the number of strokes of the modified cycle to the number of strokes of the standard cycle.

9. A control system according to claim 7, wherein the first calculator calculates a target volumetric flow ratio per one operative cylinder in place of the target intake air quantity, and the second calculator calculates that throttle valve target opening area from the target volumetric flow ratio in place of the target intake air quantity.

10. A control system according to claim 7, wherein the second calculator further calculates a target opening area coefficient that is a value obtained by dividing the target throttle valve opening area by a displacement and an engine speed, and the controller controls the throttle valve opening degree so that the target opening area coefficient is obtained in place of the target throttle valve opening area.

11. A control system according to claim 7, wherein the target intake air quantity per one operative cylinder is calculated based on a target intake air quantity per one operative cylinder at the full cylinder operation, a total number of cylinders, and a number of operative cylinders at a part cylinder operation.

12. A control system according to claim 7, wherein the target intake air quantity per one cylinder at the modified cycle operation is calculated based on a target intake air quantity per one cylinder at the standard cycle operation, the number of strokes of the modified cycle, and the number of strokes of the standard cycle.

13. A control system for a multi-cylinder internal combustion engine in which switching between full cylinder operation with all cylinders in operation and part cylinder operation with some of cylinders kept out of operation is selectively performed, comprising:
   means for calculating, at the part cylinder operation, a target intake air quantity per one operative cylinder that enables the engine to produce a torque equal to that at the full cylinder operation;
   means for calculating a throttle valve target opening area at the part cylinder operation from the target intake air quantity per one operative cylinder; and
   means for controlling a throttle valve opening degree so that the throttle valve target opening area is obtained.

14. A control system for a multi-cylinder internal combustion engine in which switching between a standard cycle operation in which the engine is operated in a standard cycle and a modified cycle operation in which the engine is operated in a modified cycle different in the number of strokes from the standard cycle by controlling operations of intake and exhaust valves, comprising:
   means for calculating, at the modified cycle operation, a target intake air quantity per one cylinder that enables the engine to produce a torque equal to that at the standard cycle operation;
   means for calculating a throttle valve target opening area at the modified cycle operation from the target intake air quantity per one cylinder; and
   means for controlling a throttle valve opening degree so that the throttle valve target opening area is obtained.

15. A control method for a multi-cylinder internal combustion engine in which switching between full cylinder operation with all cylinders in operation and part cylinder operation with some of cylinders kept out of operation is selectively performed, comprising:

calculating, at the part cylinder operation, a target intake air quantity per one operative cylinder that enables the engine to produce a torque equal to that at the full cylinder operation;

calculating a throttle valve target opening area at the part cylinder operation from the target intake air quantity per one operative cylinder; and controlling a throttle valve opening degree so that the throttle valve target opening area is obtained.

16. A control method according to claim 15, wherein the target intake air quantity per one operative cylinder at the part cylinder operation is a value obtained by dividing a target intake air quantity per one operative cylinder at the full cylinder operation by a ratio of the number of operative cylinders at the part cylinder operation to the total number of cylinders.

17. A control method according to claim 15, wherein the first-mentioned calculating calculates a target volumetric flow ratio per one operative cylinder in place of the target intake air quantity, and the second-mentioned calculating calculates the throttle valve target opening area from the target volumetric flow ratio in place of the target intake air quantity.

18. A control method according to claim 15, wherein the second-mentioned calculating further calculates a target opening area coefficient that is a value obtained by dividing the target throttle valve opening area by a displacement and an engine speed, and the controlling controls the throttle valve opening degree so that the target opening area coefficient is obtained in place of the target throttle valve opening area.

19. A control method according to claim 15, wherein the target intake air quantity per one operative cylinder at the part cylinder operation is calculated based on a target intake air quantity per one operative cylinder at the full cylinder operation, the total number of cylinders, and the number of operative cylinders at the part cylinder operation.

20. A control method for a multi-cylinder internal combustion engine capable of selectively switching between a standard cycle operation in which the engine is operated in a standard cycle and a modified cycle operation in which the engine is operated in a modified cycle different in number of strokes from the standard cycle by controlling operations of intake and exhaust valves, comprising:

calculating, at the modified cycle operation, a target intake air quantity per one cylinder that enables the engine to produce a torque equal to that at the standard cycle operation;

calculating a throttle valve target opening area at the modified cycle operation from the target intake air quantity per one cylinder; and controlling a throttle valve opening degree so that the throttle valve target opening area is obtained.

21. A control method according to claim 20, wherein the target intake air quantity per one cylinder is a value obtained by multiplying a target intake air quantity per one cylinder at the standard cycle operation by a ratio of the number of strokes of the modified cycle to the number of strokes of the standard cycle.

22. A control method according to claim 20, wherein the first-mentioned calculating calculates a target volumetric flow ratio per one operative cylinder in place of the target intake air quantity, and the second-mentioned calculating calculates the throttle valve target opening area from the target volumetric flow ratio in place of the target intake air quantity.

23. A control method according to claim 20, wherein the second-mentioned calculating further calculates a target opening area coefficient that is a value obtained by dividing the target throttle valve opening area by a displacement and an engine speed, and the controlling controls the throttle valve opening degree so that the target opening area coefficient is obtained in place of the target throttle valve opening area.

24. A control method according to claim 20, wherein the target intake air quantity per one cylinder at the modified cycle operation is calculated based on a target intake air quantity per one cylinder at the at the standard cycle operation, the number of strokes of the modified cycle, and the number of strokes of the standard cycle.

* * * * *